Sept. 4, 1923.
P. F. SCHRYER
1,467,120
WATER CIRCULATING PUMP FOR ENGINES
Filed May 8, 1922
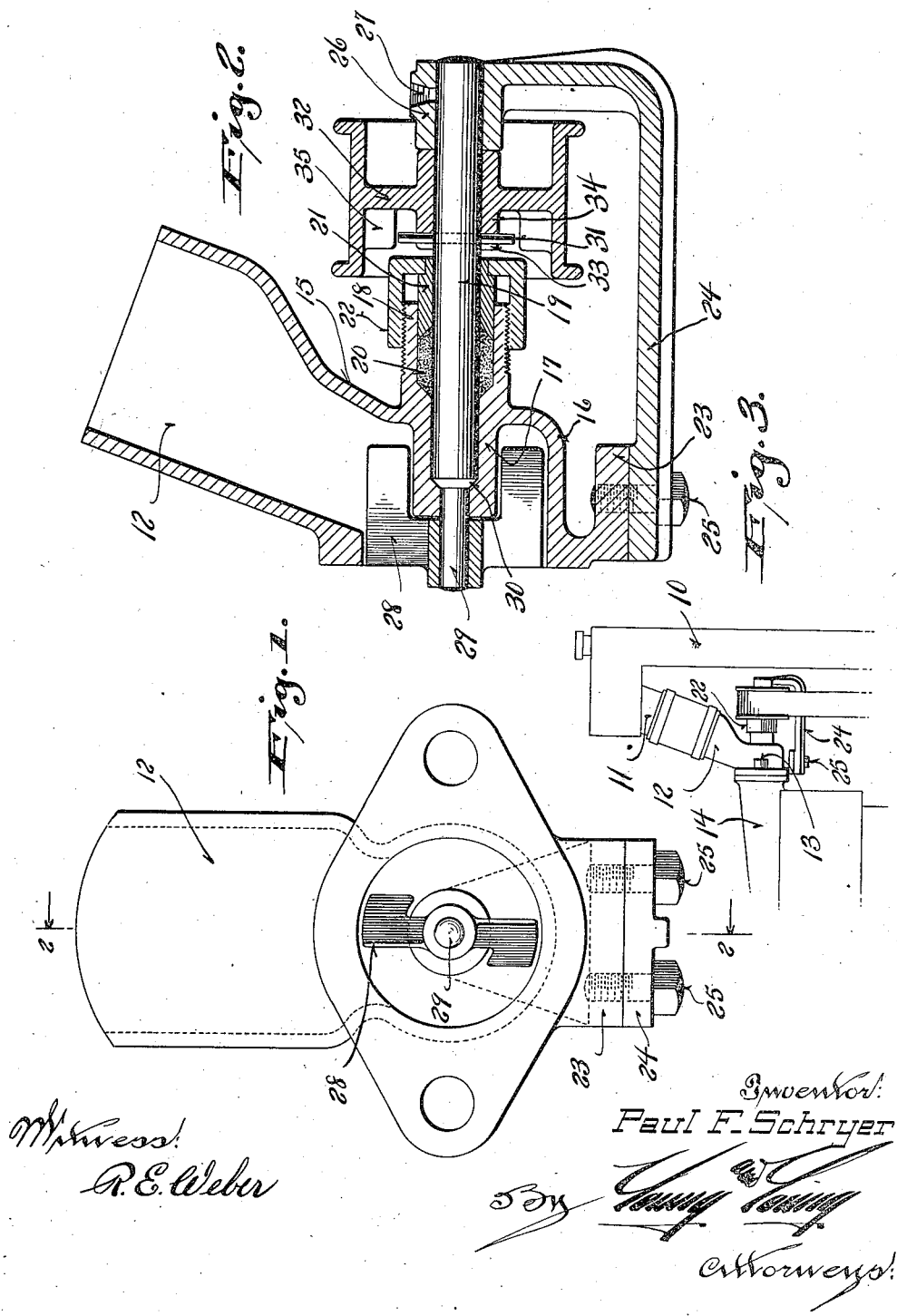

Patented Sept. 4, 1923.

1,467,120

UNITED STATES PATENT OFFICE.

PAUL F. SCHRYER, OF WAUWATOSA, WISCONSIN.

WATER-CIRCULATING PUMP FOR ENGINES.

Application filed May 8, 1922. Serial No. 559,404.

*To all whom it may concern:*

Be it known that I, PAUL F. SCHRYER, a citizen of the United States, and resident of Wauwatosa, in the county of Milwaukee and State of Wisconsin, have invented certain new and useful Improvements in Water-Circulating Pumps for Engines; and I do hereby declare that the following is a full, clear, and exact description thereof.

The invention relates to improvements in circulators and more particularly to devices of this character, which are adapted primarily for use in connection with the cooling systems of automobile power plants, the type of the device being shown in Patent No. 1,310,324, July 15, 1919, issued to John P. Cluley.

In the type of devices referred to, difficulty is experienced by reason of the provision of merely one bearing point for the rotating shaft on which the fan for circulating the liquid is positioned.

Applicant's device comprises a casting, a bearing integral therewith and receiving the shaft, and a support integral with the casting. A bracket is bolted to the support and has a bearing at its end for the reception of the other end of the shaft. A pin is transversely directed through the shaft, a pulley being mounted on the shaft between the bearing on the bracket and the pin and being made rigid with the shaft by the pin. The casting is constricted at its lower portion.

Objects of the construction are the provision of two bearing points for the rotating shaft, which eliminates the defect of the one bearing point structure, wherein the rotation of the shaft wears away the contacting parts and produces angling of the shaft in the bearing, the parts being loose and friction and leakage being developed.

A further object is the production of a construction having the advantages of two bearing points, yet not necessitating the location of the pulley for rotating the shaft closer to the radiator. It will be noted that this pulley cooperates with a pulley on the crank shaft and is spaced properly thereabove. Applicant's bracket is positioned below the pulley, an object of the location being the non-interference with the belt for rotating the pulley.

A further object of the construction is the utilization of the added bearing for the purpose of holding the pulley in position on the shaft.

A still further object is the readiness of assemblage of parts, the pulley being positioned on the shaft and the bracket being properly secured so that to position the pulley or remove the same, it is unnecessary to remove the casting from its fixed position, but the bracket may be merely released.

With the above and other objects in view, which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:—

Figure 1 is a side elevation of the circulator detached.

Figure 2 is a cross section thereof on the line 2—2 of Figure 1, and

Figure 3 is a side elevation showing the device as applied to the engine.

The radiator 10 is provided with an inlet 11 with which casting 12 secured by bolts 13 to jacket outlet 14 is in communication. Casting 12 is constricted at 15 and has a substantially cylindrical portion 16, a bearing 17 being integral therewith. A sleeve 18 projects laterally from bearing 17 and is spaced from shaft 19, providing a pocket for the reception of packing 20 and gland 21, which may be urged forwardly by cap 22 in threaded connection with sleeve 18. Integral with cylindrical portion 16 is a support 23 to which bracket 24 is secured by bolts 25. Bearing 26 is rigid with bracket 24 and apertured at 27 to receive a grease cup. Shaft 19 is rotatably mounted in bearings 17 and 26 and impelling element 28 is secured to an extension 29 thereof, a shoulder 30 being formed to prevent lateral movement of the shaft. Pin 31 extends transversely through the shaft.

In assembling the device, pulley 32 is placed on the shaft and pin 31 is received in recesses 33 in the hub 34 thereof, lugs 35 on pulley 32 operating to prevent lateral movement of pin 31. Thus, pulley 32 is locked against rotary movement with respect to shaft 19. Bracket 24 is then placed in position and operates to limit pulley 32 against lateral travel in one direction. It is apparent that the shape of cylindrical portion 16 cooperates especially with impelling element 28 to induce a flow of the liquid through casting 12.

It will be noted that the impelling element is so constructed as to allow the thermo-siphon cooling system to operate while the motor is not running. This is advantageous also if the belt breaks or other trouble develops causing the pump to stop. The angle of the blades does not obstruct the free movement of the liquid produced in the thermo-siphon action.

I claim:—

1. A circulating pump for an internal combustion engine comprising a casing having apertured ears and a machined face whereby the casing is adapted to be bolted directly to said engine, a bearing integral therewith, a shaft journaled in said bearing, said casing having a machined face, a bracket having a correspondingly machined face, bolts adapted to detachably secure said bracket to said casing with the said faces in contact, a second bearing carried by said bracket and adapted to support the outer end of said shaft, a pulley mounted between said supports and having a hub provided with a diametrical slot across one end, a pin carried by said shaft and adapted to seat within said slot, and an impeller carried by said shaft and positioned interiorly of said casing, whereby said pulley is detachably operatively coupled to said shaft by a sliding joint and is held in place by said bracket.

2. A circulator comprising a casting, a substantially cylindrical portion integral therewith, a bearing integral with said portion, a support integral with said cylindrical portion, a bracket, bolts securing said bracket to said support, a second bearing on said bracket receiving one end of said shaft, the other end of said shaft having a shoulder thereon, an extension integral with said shaft, an impelling element on said extension, a pin transversely extending through said shaft, a pulley, a hub on said pulley having recesses receiving said pin, said second bearing limiting the movement of said pulley in one direction.

3. A circulating pump for an internal combustion engine comprising a casing, a bearing integral therewith, a shaft journalled in said bearing, a bracket detachably secured to said casing, a second bearing carried by said bracket and adapted to support the outer end of said shaft, a pulley mounted between said supports and having a hub provided with a diametrical slot across one end and having inwardly projecting lugs opposite the ends of said slot, a pin carried by said shaft and adapted to seat within said slot and between said lugs, and an impeller carried by said shaft and positioned interiorly of said casing, whereby said pulley is detachably operatively coupled to said shaft and said pin is prevented from coming out, said pulley being held in place by said bearing.

In testimony that I claim the foregoing I have hereunto set my hand at Milwaukee, in the county of Milwaukee and State of Wisconsin.

PAUL F. SCHRYER.